US012431263B2

(12) United States Patent
Masluk

(10) Patent No.: US 12,431,263 B2
(45) Date of Patent: Sep. 30, 2025

(54) TRANSMISSION STRUCTURE INCLUDING INTERWOVEN ELECTRICAL CONDUCTORS

(71) Applicant: INTERNATIONAL BUSINESS MACHINES CORPORATION, Armonk, NY (US)

(72) Inventor: Nicholas A. Masluk, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 18/357,081

(22) Filed: Jul. 21, 2023

(65) Prior Publication Data

US 2025/0029749 A1 Jan. 23, 2025

(51) Int. Cl.
*H01B 7/08* (2006.01)
*H01B 11/10* (2006.01)
*H01B 11/18* (2006.01)
*H05K 1/02* (2006.01)

(52) U.S. Cl.
CPC ..... *H01B 11/1033* (2013.01); *H01B 11/1058* (2013.01); *H01B 11/1895* (2013.01)

(58) Field of Classification Search
CPC ....... H01B 7/08; H05K 1/0216; H05K 1/0228
USPC .................................................. 174/261, 262
See application file for complete search history.

(56) References Cited

U.S. PATENT DOCUMENTS

| | | | | |
|---|---|---|---|---|
| 4,143,236 | A | 3/1979 | Ross | |
| 5,504,273 | A | 4/1996 | Nakanishi | |
| 5,646,368 | A * | 7/1997 | Muyshondt | H05K 1/0228 174/250 |
| 5,868,361 | A | 2/1999 | Rinderer | |
| 6,300,846 | B1 * | 10/2001 | Brunker | H05K 1/0228 174/33 |
| 8,300,363 | B2 * | 10/2012 | Arai | G11B 5/486 360/245.8 |
| 9,108,387 | B2 | 8/2015 | Retz | |
| 10,249,411 | B2 | 4/2019 | Kunz | |

(Continued)

FOREIGN PATENT DOCUMENTS

| | | |
|---|---|---|
| CN | 201936679 U | 8/2011 |
| CN | 202662313 U | 1/2013 |

(Continued)

OTHER PUBLICATIONS

Kam, D.G. et al., "A New Twisted Differential Line Structure on High-Speed Printed Circuit Boards to Enhance Immunity to Crosstalk and External Noise", IEEE Microwave and Wireless Components Letters (2003), vol. 13:9, pp. 441-413.

(Continued)

*Primary Examiner* — Chau N Nguyen
(74) *Attorney, Agent, or Firm* — Amin, Turocy & Watson, LLP

(57) ABSTRACT

A transmission structure includes a first conductor and a second conductor interwoven with the first conductor. A plurality of portions of the first conductor pass through a corresponding plurality of openings in the second conductor. A plurality of portions of the second conductor pass through a corresponding plurality of openings in the first conductor.

20 Claims, 10 Drawing Sheets

(56) References Cited

U.S. PATENT DOCUMENTS

| | | | | |
|---|---|---|---|---|
| 11,342,646 | B2 * | 5/2022 | El Bouayadi ........ | H05K 1/0245 |
| 2006/0121790 | A1 * | 6/2006 | Hashim ................ | H05K 1/0228 439/676 |

FOREIGN PATENT DOCUMENTS

| | | | |
|---|---|---|---|
| CN | 110085358 | A | 8/2019 |
| JP | 2009004283 | A | 1/2009 |

OTHER PUBLICATIONS

CMR-Direct Cryoloom(R)—Cryogenic Woven Loom, downloaded Jun. 8, 2023 from https://www.cmr.direct.com/en/woven-loom, 4 pgs.

* cited by examiner

TRANSMISSION STRUCTURE INCLUDING INTERWOVEN ELECTRICAL CONDUCTORS

BACKGROUND

Technical Field

The present disclosure generally relates to electrical interconnects, and more particularly, to transmission structures including pairs of interwoven electrical conductors.

Description of the Related Art

Differential pair transmission lines are popular for low-frequency and moderate-frequency applications where enhanced immunity to noise and crosstalk is desirable. On a printed circuit board, for instance, pairs of closely spaced length-matched traces are used for shorter runs within the circuit board.

Twisted pair cables are widely used for high speed applications and other applications that are susceptible to electrical and magnetic interference. For instance, twisted pair cables are widely utilized in telecommunications and networking, as well as low noise instrumentation and experiments over extended runs.

SUMMARY

According to an embodiment of the present disclosure, a transmission structure includes a first conductor and a second conductor interwoven with the first conductor. A plurality of portions of the first conductor pass through a corresponding plurality of openings in the second conductor. A plurality of portions of the second conductor pass through a corresponding plurality of openings in the first conductor.

In some embodiments, each conductor includes a plurality of first traces on a first side of a dielectric layer, and a plurality of second traces on a second side of the dielectric layer. There are a plurality of vias electrically connecting the first and second traces. The vias extend through the dielectric layer.

In some embodiments, the first traces include symmetric y-shaped planar traces, and the second traces include flipped symmetric y-shaped planar traces. The plurality of vias include first and second sets of vias that electrically connect arms of the first traces to arms of the second traces. The plurality of vias further include a third set of vias that electrically connect stems of the first traces to stems of the second traces.

In one embodiment, which can be combined with the preceding embodiments, each via in the third set is proximate a via from the first set and a via from the second set such that the proximate vias are in-line and equally spaced apart.

In one embodiment, which can be combined with the preceding embodiments, the transmission structure further includes a dielectric layer between the first and second conductors. The dielectric layer is configured for a flex cable.

According to an embodiment of the present disclosure, a transmission structure includes a first conductor having a repeating pattern of electrically-connected weaves, and a second conductor having a repeating pattern of electrically-connected weaves. Each weave includes a first trace lying in a first plane, and a second trace lying in a second plane. In each weave, the first and second traces are electrically connected, and they cooperate to form an opening. The first and second conductors are interwoven such that a plurality of portions of the first conductor pass through the openings in the second conductor, and a plurality of portions of the second conductor pass through the openings in the first conductor.

According to an embodiment of the present disclosure, a system includes a first device for sending a signal, a second device for receiving the signal and a complement of the signal, and a transmission structure configured to carry the signal and its complement from the first device to the second device. The transmission structure includes first and second conductors that are interwoven such that a plurality of portions of the first conductor pass through a corresponding plurality of openings in the second conductor, and a plurality of portions of the second conductor pass through a corresponding plurality of openings in the first conductor.

In some embodiments, the system may be a quantum computing system. In some embodiments, the transmission structure may be configured as a flex cable.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
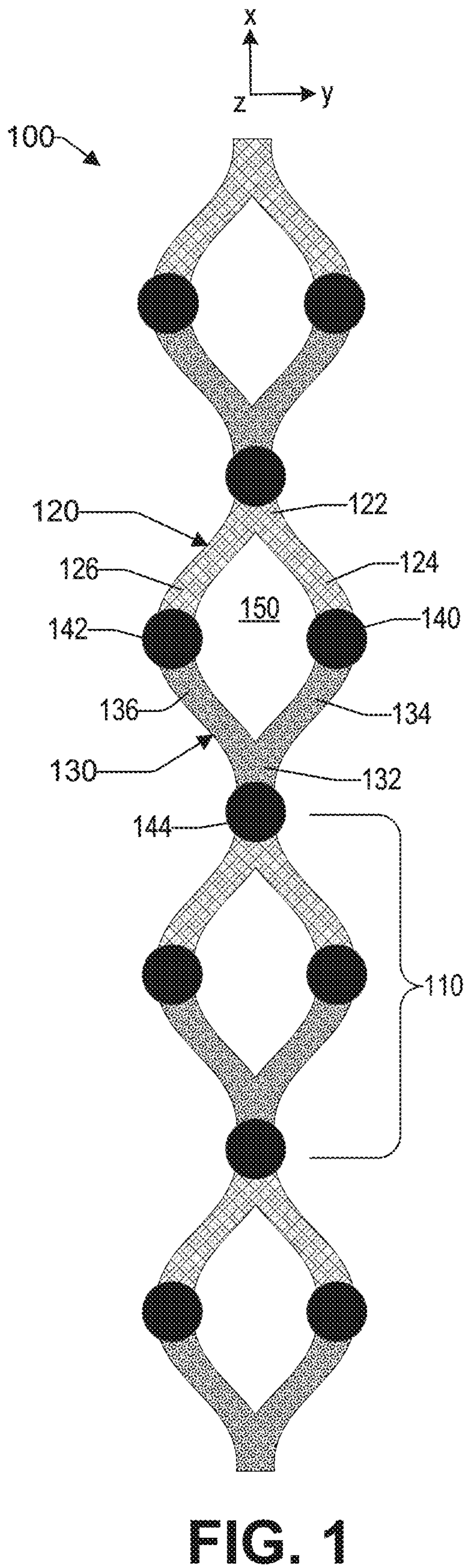
FIG. 1 is an electrical conductor, consistent with an illustrative embodiment.

In the following detailed description, numerous specific details are set forth by way of examples in order to provide a thorough understanding of the relevant teachings. However, it should be apparent that the present teachings may be practiced without such details. In other instances, wellknown methods, procedures, components, and/or circuitry have been described at a relatively high-level, without detail, in order to avoid unnecessarily obscuring aspects of the present teachings.

The present disclosure generally relates to transmission structures including pairs of interwoven electrical conductors By virtue of the concepts discussed herein, electrical and magnetic interference is reduced.

According to an embodiment of the present disclosure, a transmission structure includes a first conductor; and a second conductor interwoven with the first conductor. A plurality of portions of the first conductor pass through a corresponding plurality of openings in the second conductor; and a plurality of portions of the second conductor pass through a corresponding plurality of openings in the first conductor.

The openings enable the conductors to be interwoven such that the conductors may cross each other in a symmetric fashion. The symmetry is advantageous, as it helps to cancel noise. The small loop area between the first and second conductors, in conjunction with the alternating polarity (during differential signaling) of loops between crossings, enables the conductors to have a lower susceptibility to electrical and magnetic interference than parallel transmission lines.

In some embodiments, each conductor includes a repeating pattern of weaves. Each weave includes Y-shaped first and second traces in different planes. First and second sets of vias electrically connect arms of the first traces to arms of the second traces. The weaves are electrically connected. A third set of vias electrically connect stems of the first traces to stems of the second traces.

In one embodiment, which can be combined with the preceding embodiments, each via in the third set is proximate a via in the first set and a via in the second set such that the proximate vias are in-line and equally spaced apart. These in-line vias maintain symmetry, and thus avoid any electric dipole moments in the y-direction, or magnetic dipole moments in the z-direction.

In one embodiment, which can be combined with the preceding embodiments, an offset between the first and second conductors is one-half of a weaving rate.

In one embodiment, which can be combined with the preceding embodiments, the first and second conductors form a first pair of interwoven conductors, and the transmission structure further comprises an adjacent second pair of interwoven conductors similarly constructed as the first pair to further reduce electrical and/or magnetic interference. For example, the first and second pairs might have different weaving rates.

In one embodiment, which can be combined with the preceding embodiments, the transmission structure further includes first and second ground layers electrically connected by a plurality of vias. The first and second conductors are between the first and second ground layers. The ground layers provide shielding for the first and second conductors.

In one embodiment, which can be combined with the preceding embodiments, the first and second conductors form a first pair of interwoven conductors, and the transmission structure further includes a second pair of interwoven conductors, and a plurality of vias forming a fence between the first and second pairs. The fence is configured to reduce crosstalk due to capacitive coupling between the first and second pairs.

In some embodiments, which can be combined with the preceding embodiments, the transmission structure further includes a dielectric layer between the first and second conductors. The dielectric layer may be configured, for example, for a flex cable, or a printed circuit board, or a semiconductor layer. When configured for a flex cable, the traces are patterned, which allows for arbitrary impedances to be used, allows filters or other structures to be patterned within the flex cable, and further allows for components (e.g., filters, attenuators) to be soldered to the cable.

In one embodiment, which can be combined with the preceding embodiments, the transmission structure is double-woven. The double-woven transmission structure possesses symmetries in two dimensions that further reduce any electric or magnetic moments.

According to an embodiment of the present disclosure, a system includes a first device configured to send a signal, a second device configured to receive the signal and a complement of the signal, and a transmission structure configured to carry the signal and its complement from the first device to the second device. The transmission structure includes first and second conductors that are interwoven such that a plurality of portions of the first conductor pass through a corresponding plurality of openings in the second conductor, and a plurality of portions of the second conductor pass through a corresponding plurality of openings in the first conductor.

In some embodiments of the system, which can be combined with the preceding embodiments, the flex cable may be configured for differential signaling between two devices (e.g., qubits and readout electronics in a quantum computing system) maintained at substantially different temperatures. The flex cable may have a higher signal density than twisted pair cables.

Example Construction

Figure 2:
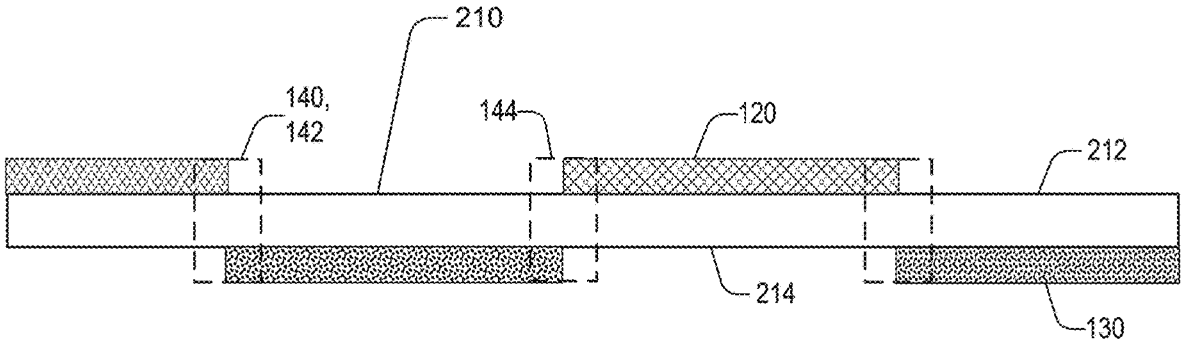
FIG. 2 is an electrical conductor on a dielectric layer, consistent with an illustrative embodiment.

Reference is made to FIGS. 1 and 2, which illustrate an electrical conductor 100, consistent with an illustrative embodiment. The conductor 100 includes a repeating pattern of weaves 110. Each weave 110 includes split traces: a first trace 120 lying in a first plane, and a second trace 130 lying in a second plane.

As used herein, a "crossing" refers to a point at which the conductor 100 exchanges places in the y-z plane.

As used herein, a "weave" refers to the minimal traverse in the x-direction of a conductor before reaching a point that has the same cross-section as a starting point. The weave is the smallest repeatable unit of the conductor 100. For example, the weave 110 of FIG. 1 includes electrically connected first and second traces 120 and 130.

As illustrated in FIG. 2, the first plane may be formed by a surface 212 of a dielectric layer 210, and the second plane may be formed by an opposite surface 214 of the dielectric layer 210. The planes are spaced apart in a z-direction.

Each weave 110 may be constructed as follows. The first trace 120 may have a Y-shape that is symmetric about an x-axis. The symmetric Y-shaped first trace 120 may have a stem 122 that branches off into two arms 124 and 126.

The second trace 130 may also have a Y-shape that is symmetric about the x-axis. The symmetric Y-shaped second trace 130 may also have a stem 132 that branches off into two arms 134 and 136.

The second trace 130 is flipped about a y-axis relative to the first trace 120. As such, the arms 134 and 136 of the second trace 130 continue where the arms 124 and 126 of the first trace 120 terminate.

The arm 124 of the first trace 120 is electrically connected to the respective arm 134 of the second trace 130, and the arm 126 of the first trace 120 is electrically connected to the respective arm 136 of the second trace 130. The electrical connections may be made by vias 140 and 142 extending in a z-direction through the dielectric layer 210.

The first and second traces 120 and 130 cooperate to form an opening 150. As a result of the weave 110 being repeated, the conductor 100 has a plurality of openings.

The weaves 110 are electrically connected together to form a conductor 110 of arbitrary length. The stem 132 of the second trace 130 may be electrically connected to the stem 122 of the first trace 120 of the next weave 110. The electrical connection may be made by a vias 144 extending in a z-direction through the dielectric layer 210.

The vias 140, 142 and 144 provide a means for crossings.

The Y-shaped traces 120 and 130 are not limited to the geometry illustrated in FIG. 1. Segments (i.e., arms 124, 126, 134, and 136 and stems 122 and 132) of the Y-shaped traces 120 and 130 may be straight or curved. Thickness of the segments may vary. Angles formed by the arms 124/126 and 134/136 may vary. Dimensions of the traces (e.g., thickness, width) may depend on thickness of the dielectric layer 210, dielectric permittivity (the dielectric constant), and a target impedance.

A pair of conductors having the same construction as the conductor 110 of FIGS. 1 and 2 may be interwoven in a symmetric fashion.

Figure 3:
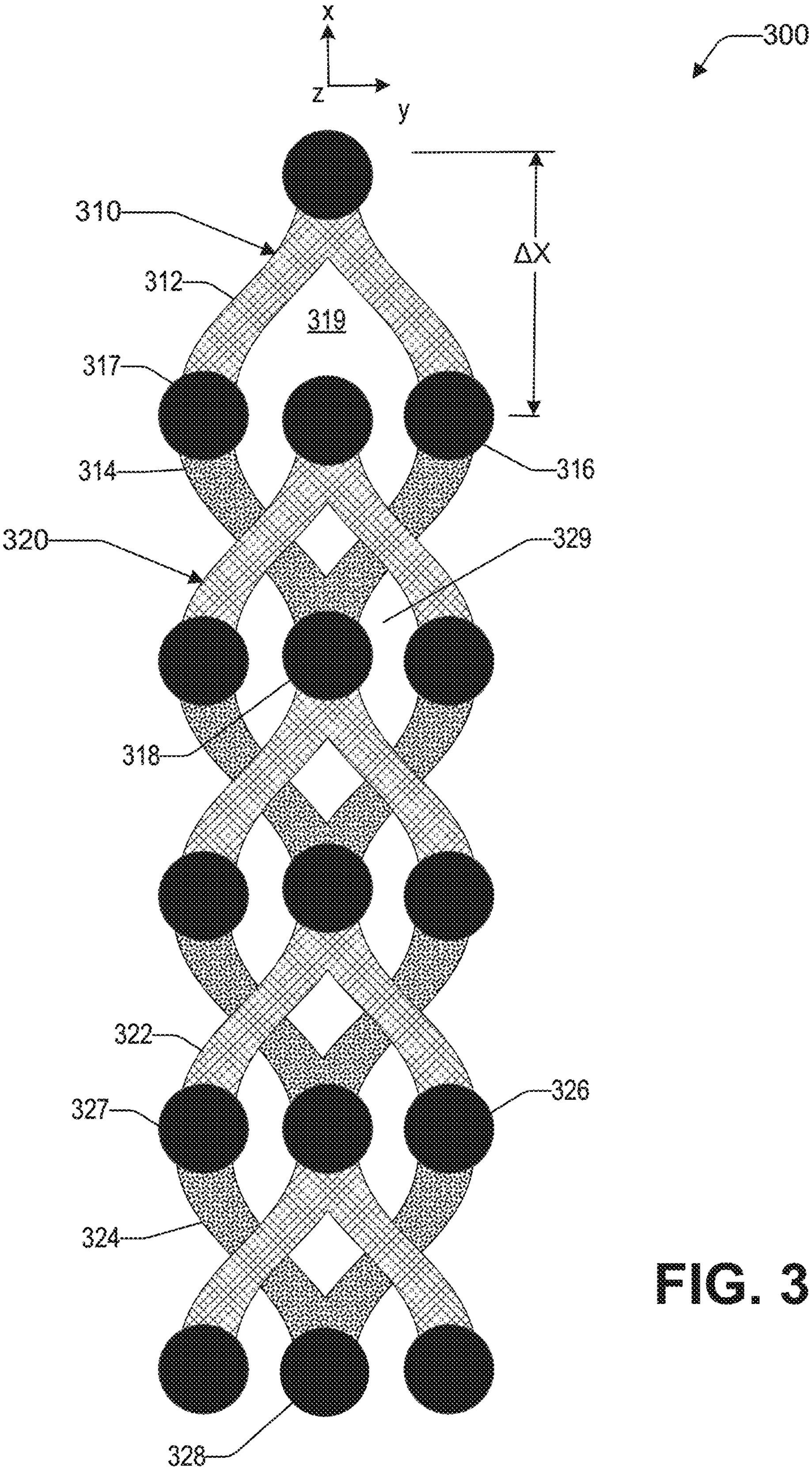
FIG. 3 is a transmission structure including a pair of interwoven electrical conductors, consistent with an illustrative embodiment.

Reference is now made to FIG. 3, which illustrates a transmission structure 300 including a first conductor 310 interwoven with a second conductor 320. Both conductors 310 and 320 have the same construction as the conductor 110 of FIGS. 1 and 2. The transmission structure 300 extends in an x-direction.

The second conductor 320 is offset from the first conductor 310 in the x-direction by an amount Δx, but it is not offset from the first conductor 310 in either the y-direction or the z-direction. Thus, the first traces 312 and 322 all lie in a first plane and they are co-linear in the x-direction. The first traces 312 of the first conductor 310 are offset by Δx from, and alternate with the first traces 322 of the second conductor 320 (that is, first trace 312, first trace 322, first trace 312, . . . ). The flipped second traces 314 and 324 all lie in a second plane and they are co-linear in the x-direction. The second traces 314 of the first conductor 310 are offset by Δx from, and alternate with the second traces 324 of the second conductor 320 (that is, second trace 314, second trace 324, second trace 314, . . . ).

The offset Δx between the first and second conductors 310 and 320 may be one-half of a weaving rate.

For each weave of the first conductor 310, the first and second traces 312 and 314 define an opening 319. For each weave of the second conductor 320, the first and second traces 322 and 324 define an opening 329.

Portions of the first traces 312 of the first conductor 310 cross portions of the second traces 324 of the second conductor 320, but do not make physical contact because they are in different planes. Portions of the first traces 322 of the second conductor 320 cross portions of the second traces 312 of the first conductor 310, but do not make physical contact because they are in different planes. The first and second conductors 310 and 320 cross each other in a symmetric fashion. In one embodiment, the crossings are the same when reflected across the x-axis.

For each weave of the first conductor, a first trace 312 is electrically connected to second trace 314 by vias 316 and 317, and the second trace 314 is electrically connected to the first trace of the next weave by a via 318. These vias 316, 317 and 318 extend in a z-direction. Each via 318 extends through an opening 329 in the second conductor 320.

For each weave of the second conductor 320, a first trace 322 is electrically connected to second trace 324 by vias 326 and 327, and the second trace 324 is electrically connected to the first trace 312 of the next weave by a via 328. These vias 326, 327 and 328 also extend in a z-direction. Each via 328 extends through an opening 319 in the first conductor 310.

The vias 319 that electrically connect the weaves of the first conductor extend in a z-direction through the openings in the second conductor. The vias that electrically connect the weaves of the second conductor extend in an z-direction through the openings in the first conductor.

The vias 316-318 and 326-328 enable signals to be swapped between planes. The vias 316-318 and 326-328 also enable the traces 312/314 and 322/324 to be split, thereby allowing portions of the first conductor 310 to pass through openings 329 in the second conductor 320, and portions of the second conductor 320 to pass through openings 319 in the first conductor 310.

The interwoven conductors 310 and 320 have a multitude of small loop areas with alternating polarity, unlike parallel conductors which have a single larger area opening. The small loop areas of alternating polarity are less susceptible to external electrical and magnetic interference.

Figure 4:
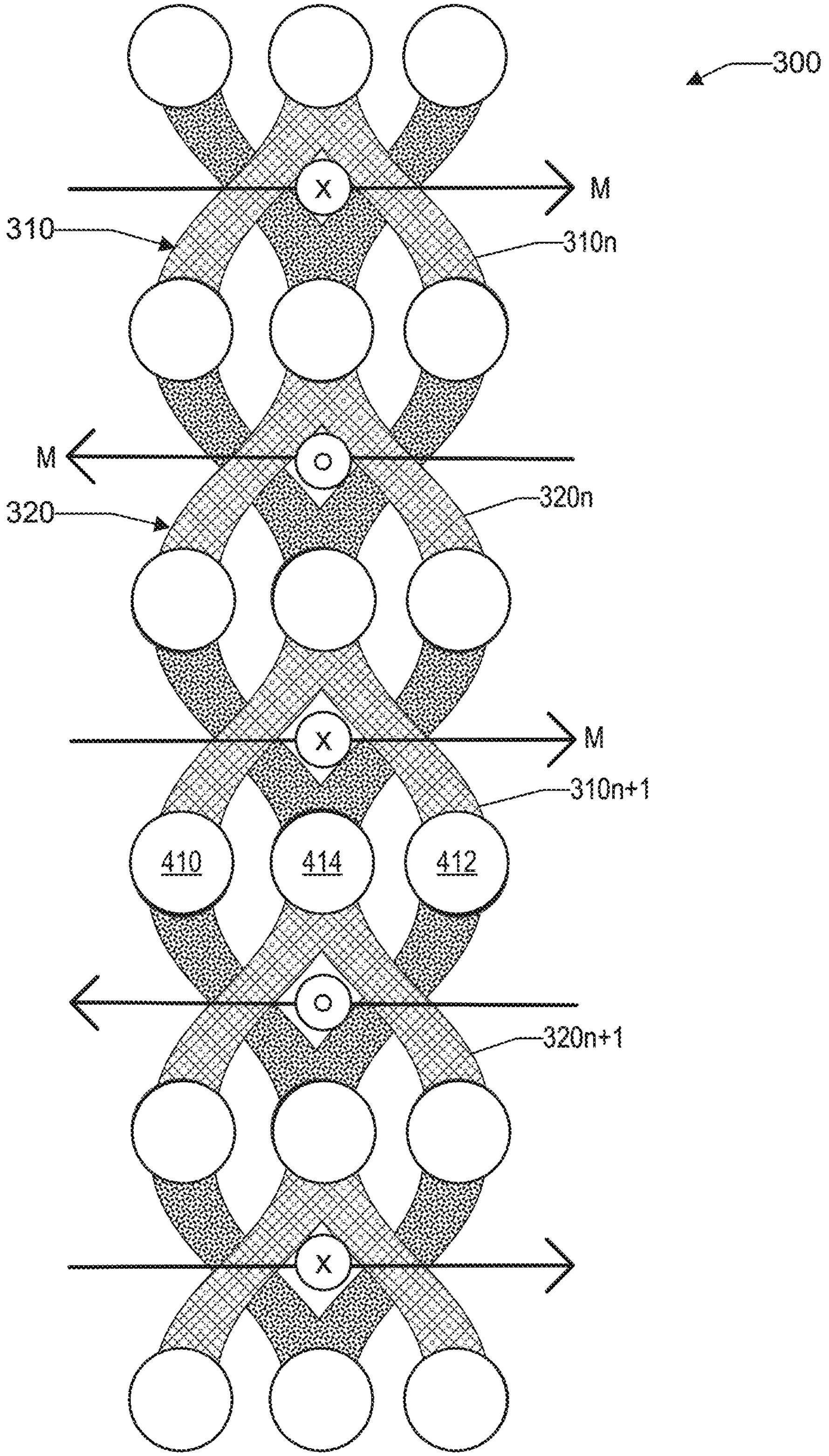
FIG. 4 is the transmission structure of FIG. 3 when used for differential signaling, consistent with an illustrative embodiment.

Reference is now made to FIG. 4, which illustrates the transmission structure 300 when used for differential signaling. Differential signaling is a method for electrically transmitting information using two complementary signals, which are equal in magnitude but opposite in polarity. One of those two signals is transmitted by the first conductor 310 and the other of those two signals is transmitted by the second conductor 320.

Electric and magnetic moments are created by the signals. The electric and magnetic moments are 90 degrees from one another.

In the transmission structure of FIG. 4, the vias are aligned. Consider aligned vias designated by 410, 412 and 414. The first and second vias 410 and 412 connect the traces of an n+1$^{th}$ weave 310$n$+1 of the first conductor 310, while the third via 414 electrically connects the nth and n+1th weaves of the second conductor 320. The third via 414 is proximate the first and second vias 410 and 412. These proximate first, second and third vias 410, 412 and 414 are in-line and equally spaced apart. These in-line vias 410, 412 and 414 maintain symmetry, and thus avoid any electric dipole moments in the y-direction, or magnetic dipole moments in the z-direction.

By crossing the pairs of conductors in a symmetric fashion, the sign (x, o) of the induced voltage between conductors is inverted from one half-weave to the next. Any noise that is capacitively coupled to the pair will tend to cancel out. By weaving the conductors 310 and 320 tightly together, on average the total induced voltage from an external aggressor can be minimized.

Magnetic moments M can be considered to be a vector quantity with direction perpendicular to the current loop in the right-hand-rule direction. Reducing the loop area reduces the magnetic moments M. The alternating direction of the moments M on average causes inducted currents from external aggressors to cancel, thereby reducing inductive coupling.

A transmission structure herein may include multiple pairs of conductors. In some embodiments, the pairs may be identical. In other embodiments, they are not identical, but rather similarly constructed. As used herein, “pairs that are similarly constructed” and “similarly constructed pairs” both refer to each pair having first and second conductors that are interwoven, where a plurality of portions of the first conductor pass through a corresponding plurality of openings in the second conductor; and a plurality of portions of the second conductor pass through a corresponding plurality of openings in the first conductor. However, those similarly constructed pairs have one or more differences, such as offset of vias, different weaving rates, and cross-sectional differences. Any one or any combination of these differences can further reduce electrical and magnetic interference.

Figure 5:
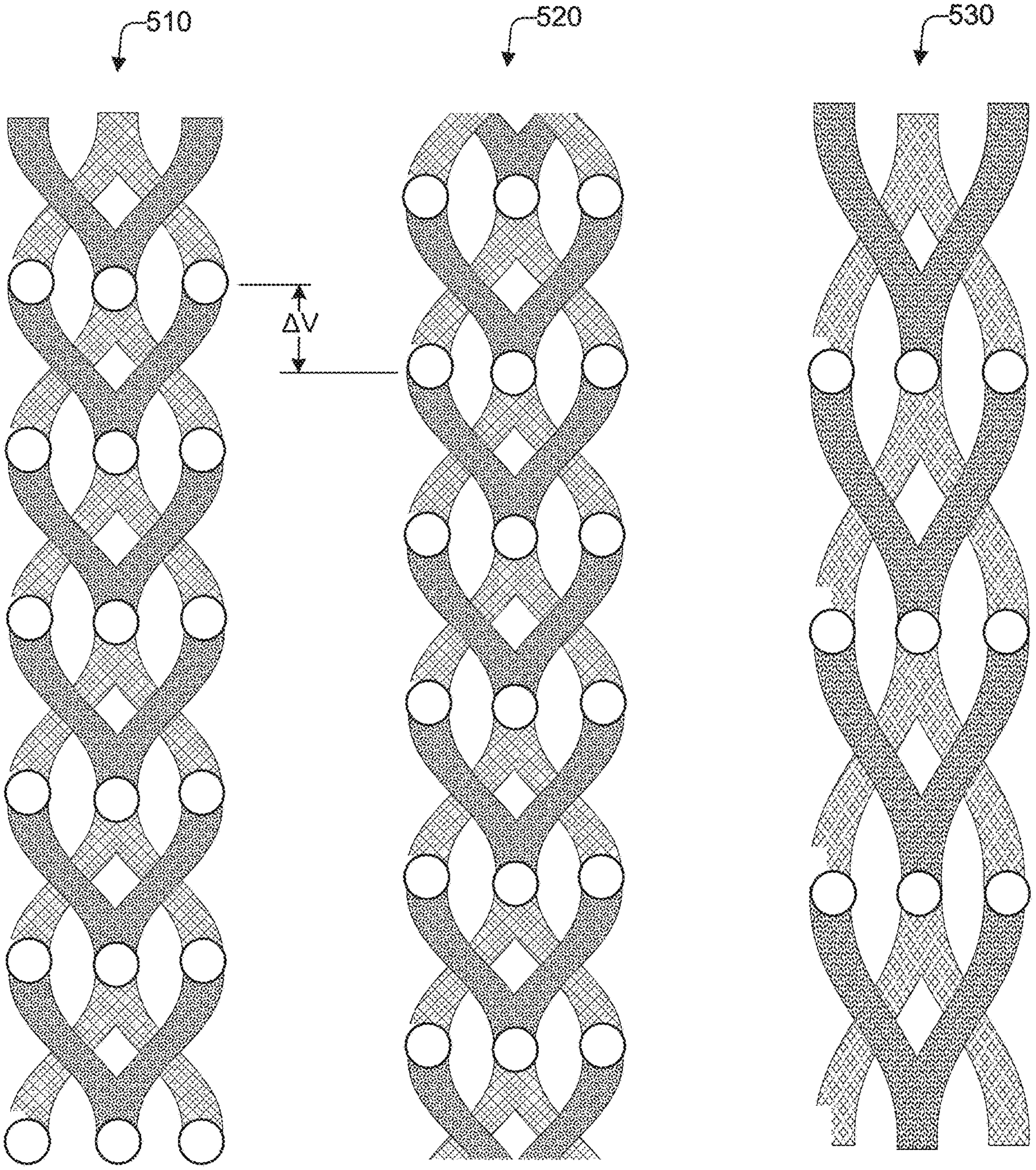
FIG. 5 is a transmission structure including multiple pairs of conductors, consistent with an illustrative embodiment.

Reference is now made to FIG. 5, which illustrates a transmission structure 500 having first, second, and third pairs 510, 520, and 530 of conductors that are similarly constructed. The first pair 510 is identical to the transmission structure illustrated in FIG. 4. The second pair 520 differs in that the in-line vias are offset by Av from in-line vias of the first pair 510. With the offset Δv, the electric and magnetic moments are 90 degrees from one another, and the electric and magnetic moments are misaligned, which substantially reduces (e.g., minimizes) crosstalk with the first pair 510. Having two neighboring pairs that weave at the same rate with a Av of one-quarter is advantageous because the magnetic and electric nodes and anti-nodes misalign perfectly, minimizing inductive and capacitive coupling.

The third pair 530 has a different weaving rate than the other pairs 510, and 520. Over the same length, the third pair 530 has fewer weaves than the other pairs 510 and 520. The longer weaves of the third pair 530 have fewer vias. Differing weave rates over long runs can cancel coupling on average.

Reducing the electrical (capacitive) and magnetic (inductive) coupling allows the pairs to be placed closer together. For example, a higher signal density is provided.

A transmission structure herein may include elements in addition to conductors. Examples of these elements are illustrated in FIGS. 6 and 7, which are discussed in more detail below.

Figure 6:
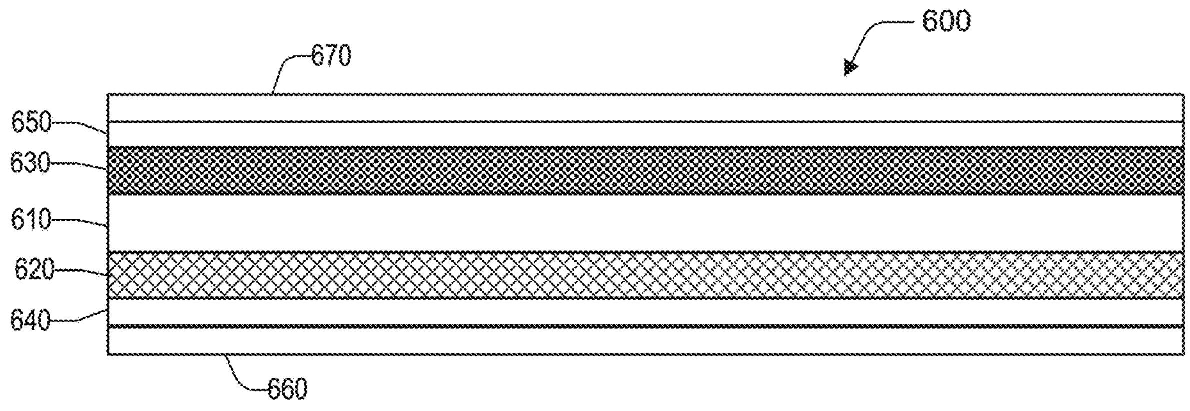
FIG. 6 is a transmission structure including a pair of interwoven electrical conductors, a dielectric layer, and ground layers, consistent with an illustrative embodiment.

Reference is now made to FIG. 6. A transmission structure 600 includes a dielectric layer 610, first traces 620 on one side of the dielectric layer 610, and second traces 630 on an opposite side of the dielectric layer 610. Vias (not shown) extend through the dielectric layer 610 and connect the first and second traces 620 and 630 to form two interwoven conductors.

The transmission structure 600 further includes first and second ground layers 660 and 670 that are electrically connected together (e.g., by vias). The two interwoven conductors and dielectric layer 610 are sandwiched between dielectric layers 640 and 650 the first and second ground layers 660 and 670. The ground layers 660 and 670 may be solid, or they may be mesh to reduce thermal conductivity. The ground layers s 660 and 670 provide shielding for the interwoven conductors against electrical interference.

Figure 7:
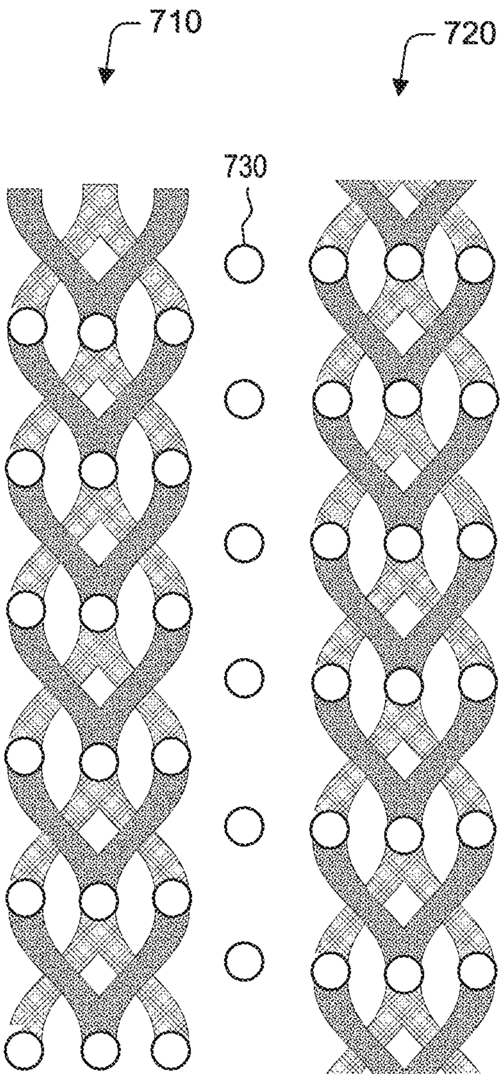
FIG. 7 is transmission structure including two pairs of interwoven electrical conductors, a dielectric layer, and a via fence, consistent with an illustrative embodiment.

Reference is now made to FIG. 7. A transmission structure 700 includes first and second pairs 710 and 720 of interwoven conductors, and vias 730 forming a fence between the first and second pairs 710 and 720. The first and second pairs 720 are offset by a Av of one-quarter. The vias 730 forming the fence are configured to reduce crosstalk between the first and second pairs 710 and 720 by reducing the direct capacitive coupling between the conductors of the first pair 710 to the conductors of the second pair 720.

A transmission structure herein may be oriented differently than the transmission structures above. In some embodiments, the transmission structure may be rotated about the x-axis.

Figure 8:
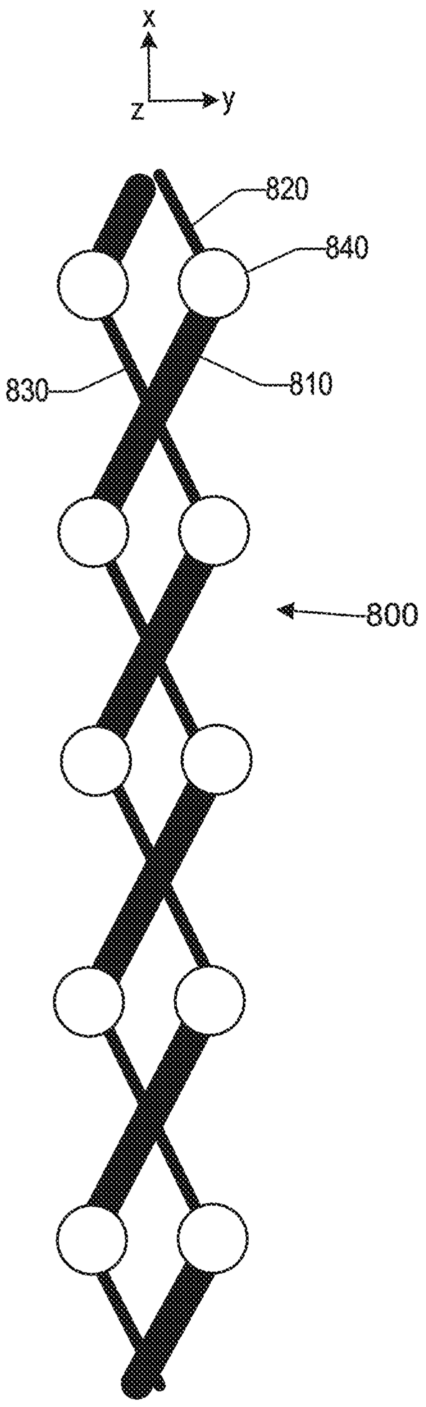
FIG. 8 is a transmission structure including a pair of interwoven electrical conductors, consistent with an illustrative embodiment.

Reference is now made to FIG. 8, which illustrates a transmission structure 800 rotated 90 degrees about the x-axis. This transmission structure 800 includes a center layer of traces 810 sandwiched between two outer layers of traces 820 and 830. The traces 810 in the center layer are thicker than the traces 820 and 830 in the outer layers in order to preserve the capacitance per unit length along the conductor regardless of the layers it resides on. The outer layers have identical patterning, such that the traces 820 and 830 are simultaneously patterned on both outer layers. Vias 840 tie the traces 810, 820 and 830 of these three layers together.

The transmission structure 800 of FIG. 8 suppresses magnetic pickup along the array of the conductors (the y-direction). In contrast, the transmission structure 300 of FIG. 3 suppresses pickup into the plane upon which the traces are patterned (the z-direction).

Figure 9:
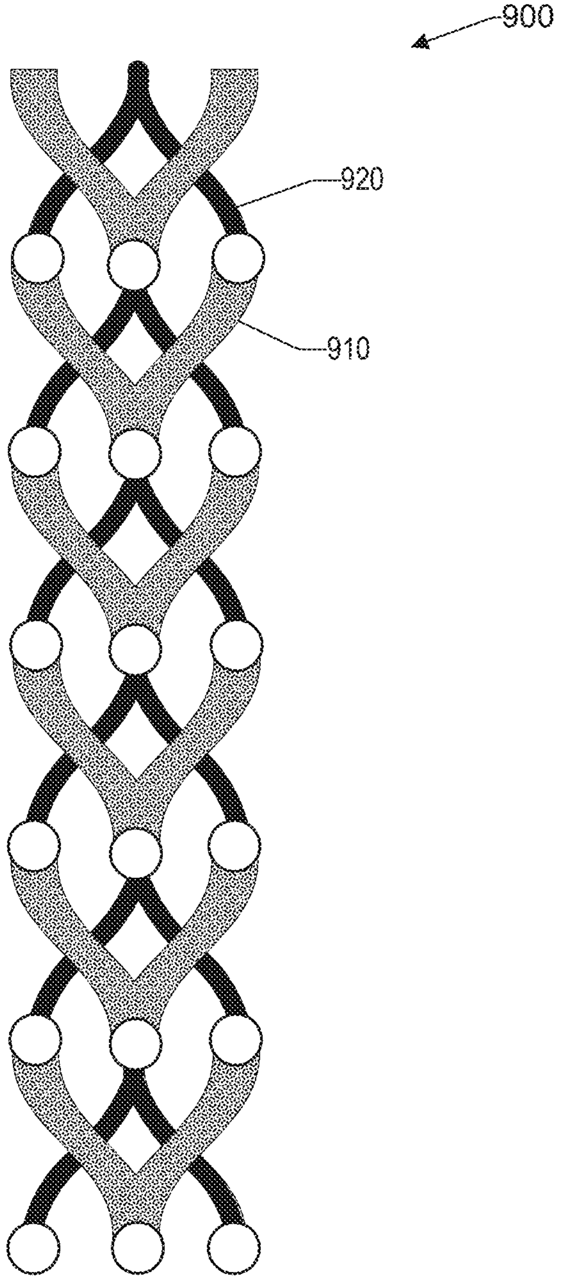
FIG. 9 is a transmission structure that is double-woven, consistent with an illustrative embodiment.

Reference is now made to FIG. 9. To suppress noise along both y- and z-directions, the transmission structures 300 and 800 of FIGS. 3 and 8 may be combined to produce a three-layer transmission structure 900. The transmission structure 900 may be characterized as double-woven. Thick traces 910 are on a central layer, while thin traces 920 are patterned on both outer layers simultaneously. The thin traces 920 are used to offset the increase in capacitance that results in having the thin traces 920 on two layers, so the width is reduced to preserve the same transmission line impedance. The transmission structure 900 of FIG. 9 possesses symmetries in two dimensions that further reduce any electric or magnetic moments.

Different Embodiments of the Dielectric Layer

The traces may be formed on the surfaces of the dielectric layer, but a transmission structure herein is not so limited. In some embodiments, the traces may be embedded in a dielectric layer, or sandwiched between dielectric layers as part of a multi-layer structure. Consider the example of the transmission structure including ground layers. In a four-layer stackup, two outer layers are configured as ground layers, while two inner layers are configured for signal transmission. For each inner layer, conductor pairs may be fully embedded within a dielectric layer.

The dielectric layer can be application-specific. In some embodiments, the dielectric layer may be configured as a flexible layer that is part of a flex cable. In other embodiments, the dielectric layer may be configured as a printed circuit board. In still other embodiments, the dielectric layer may be configured as a layer of a semiconductor chip. The traces and vias of the transmission structures may be formed by standard lithographic techniques. In some embodiments, the dielectric layer may be part of a transmission structure herein. In some embodiments, the dielectric layer may be independent of a transmission structure herein.

One or more transmission structures herein may be used in a system. For instance, one or more semiconductor chips having multiple transmission structures herein may be surface mounted to a printed circuit board. The printed circuit board may also carry one or more transmission structures herein for sending signals to various components on the printed circuit board. One or more flex cables having transmission structures herein may connect the printed circuit board to various external devices.

A transmission structure herein is not limited to any particular system. In some embodiments, one or more of the transmission structures may be used in low-frequency and moderate-frequency systems. In other embodiments, one or more of the transmission structures may be used in high frequency systems.

A transmission structure herein is advantageous for differential signaling in systems where signals are more sensitive to magnetic and electrical interference. A transmission structure herein is particularly advantageous for differential signaling in systems having limits on moving sending and receiving circuits closer together (to reduce loop area), and where high signal density is desired. One such system is a quantum computing system.

Example Particularly Configured for Quantum Computing Platform

Figure 10:
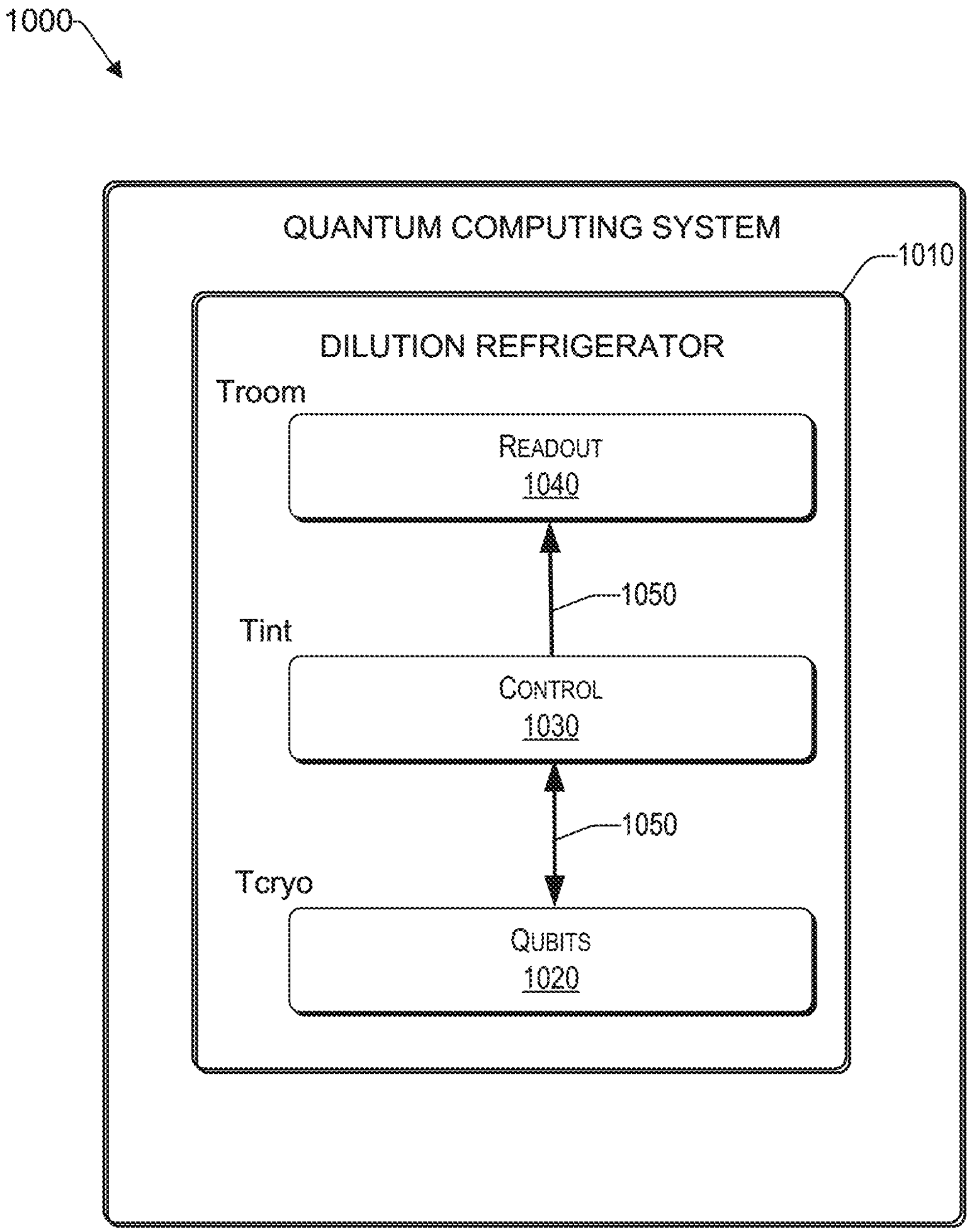
FIG. 10 is a quantum computing system, consistent with an illustrative embodiment.

Reference is now made to FIG. 10, which illustrates certain elements of a quantum computing system 1000. The quantum computing system 1000 exploits quantum mechanical phenomena. The basic unit of information in quantum computing is the qubit. When measuring a qubit, the result is a probabilistic output of a classical bit.

The quantum computing system 1000 may include a dilution refrigerator 1010, which includes multiple plates that get successively colder the closer they are to the ground. Each plate is a different temperature, with the very top layer sitting at room temperature (Troom). A quantum processor, which includes qubits 1020, is mounted to the lowest, and coldest, plate which attains a cryogenic temperature (Tcryo) around 10 to 15 milli-Kelvin in order to prevent significant decoherence.

Control electronics 1030 may be located at an intermediate temperature (Tint) or room temperature (Troom). The control electronics 1030 may generate microwave pulses that are appropriately sequenced, aligned, and distributed to control the qubits 1020. The control electronics 1030 may also generate readout pulses that retrieve the states of the qubits 1020, which are translated back into binary values and sent to readout electronics 1040. The readout electronics 1040 may be located in the top layer at room temperature (Troom).

Flex cables 1050 herein may be used for differential signaling between the different temperature stages, and they may also be used for differential signaling within a temperature stage. The flex cables 1050 herein may have a higher signal density than conventional twisted pair cables.

The quantum computing system 1000 might have a superconducting qubit architecture where qubits 1020 may be tuned using magnetic flux biasing, and that biasing can change rapidly. Flex cables 1050 may also be used between a current source and a structure that produces the magnetic field for the biasing.

The flex cables 1050 can be routed more easily than conventional twisted pair cables, and they make use of unique materials that are supported by flex manufacturing. Materials for the traces are suitable for cryogenic temperatures. One choice is copper, which is highly conductive, inexpensive, and has well-established manufacturing techniques. Other choices for the materials include, but are not limited to constantan, manganin, beryllium copper alloy, and niobium-titanium alloy.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A transmission structure comprising:

a first conductor; and a second conductor interwoven with the first conductor, wherein:

a plurality of portions of the first conductor pass through a corresponding plurality of center openings in the second conductor; and a plurality of portions of the second conductor pass through a corresponding plurality of center openings in the first conductor, wherein each opening of the first and second conductor is only passed through once.

2. The transmission structure of claim 1, wherein the first and second conductors cross each other in a symmetric fashion.

3. The transmission structure of claim 1, wherein each conductor comprises:

a plurality of first traces on a first side of a dielectric layer;

a plurality of second traces on a second side of the dielectric layer; and a plurality of vias electrically connecting the first and second traces, the vias extending through the dielectric layer.

4. The transmission structure of claim 3, wherein:

the first traces include symmetric y-shaped planar traces; and the second traces include flipped symmetric y-shaped planar traces.

5. The transmission structure of claim 4, wherein the plurality of vias include:

first and second sets of vias electrically connecting arms of the first traces to arms of the second traces; and a third set of vias electrically connecting stems of the first traces to stems of the second traces.

6. The transmission structure of claim 5, wherein:

the openings are formed by the arms of the first and second traces; and the third set of vias pass through the openings.

7. The transmission structure of claim 5, wherein:

each via in the third set of vias is proximate a via in the first set and a via in the second set; and the proximate vias are in-line and equally spaced apart.

8. The transmission structure of claim 1, wherein an offset between the first and second conductors is one-half of a weaving rate.

9. The transmission structure of claim 1, wherein:

the first and second conductors form a first pair of interwoven conductors; and the transmission structure further comprises an adjacent second pair of interwoven conductors similarly constructed as the first pair to further reduce electrical and/or magnetic interference.

10. The transmission structure of claim 9, wherein the first and second pairs of interwoven conductors have different weaving rates.

11. The transmission structure of claim 1, further comprising first and second ground layers electrically connected by a plurality of vias, wherein the first and second conductors are between the first and second ground layers.

12. The transmission structure of claim 1, further comprising:

a second pair of interwoven conductors, wherein the first and second conductors form a first pair of interwoven conductors; and a plurality of vias forming a fence between the first and second pairs, the fence configured to reduce crosstalk between the first and second pairs.

13. The transmission structure of claim 1, further comprising a dielectric layer between the first and second conductors, wherein the dielectric layer is configured for a flex cable.

14. The transmission structure of claim 1, further comprising a dielectric layer between the first and second conductors, wherein the dielectric layer is configured as a printed circuit board.

15. The transmission structure of claim 1, further comprising a dielectric layer between the first and second conductors, wherein the dielectric layer is configured as a semiconductor layer.

16. The transmission structure of claim 1, wherein the transmission structure is double-woven.

17. A transmission structure comprising:

a first conductor having a repeating pattern of electrically-connected weaves; and a second conductor having a repeating pattern of electrically-connected weaves; wherein:

each weave includes:

a first trace lying in a first plane, and a second trace lying in a second plane;

the first and second traces are electrically connected;

the first and second traces cooperate to form an opening, whereby the first conductor has a plurality of center openings and the second conductor has a plurality of center openings; and the first and second conductors are interwoven such that a plurality of portions of the first conductor pass through the center openings in the second conductor once each time, and a plurality of portions of the second conductor pass through the center openings in the first conductor once each time.

18. A system comprising:

a first device configured to send a signal;

a second device configured to receive the signal and a complement of the signal; and a transmission structure configured to carry the signal and its complement from the first device to the second device, the transmission structure including first and second conductors that are interwoven such that a plurality of portions of the first conductor pass through a corresponding plurality of center openings in the second conductor once each time, and a plurality of portions of the second conductor pass through a corresponding plurality of center openings in the first conductor once each time.

19. The system of claim 18, further comprising a dilution refrigerator configured to maintain the first device at a cryogenic temperature.

20. The system of claim 19, wherein:

the system is a quantum computing system; and the transmission structure is configured as a flex cable.

* * * * *